United States Patent [19]
Hughes et al.

[11] 3,921,175
[45] Nov. 18, 1975

[54] METHOD OF MONOPULSE ANGLE GATING FOR COMPUTER

[75] Inventors: Richard S. Hughes; James L. Phillips, both of Dallas, Tex.

[73] Assignee: The United States of America as represented by the Secretary of the Navy, Washington, D.C.

[22] Filed: Feb. 20, 1968

[21] Appl. No.: 707,923

[52] U.S. Cl. .......... 343/119; 343/113 R; 343/117 R
[51] Int. Cl.² .......................................... G01S 3/16
[58] Field of Search .............. 343/119, 117, 16, 113

[56] References Cited
UNITED STATES PATENTS 3,097,356   7/1963   Ruisinger ........................ 343/113 R
3,340,532   9/1967   Glomb et al. .................... 343/117 R Primary Examiner—Maynard R. Wilbur
Assistant Examiner—Richard E. Berger
Attorney, Agent, or Firm—R. S. Sciascia; Roy Miller

[57] ABSTRACT

A monopulse angle-gated guidance system consisting of a radio frequency receiver having an antenna, feed assembly and detectors, and a guidance computer including the basic computer and multiple target processing and scanning circuitry.

A monopulse angle-gated guidance system for providing pursuit-navigation information to the servo system of an associated missile and provides a direction-finding information of radiating sources to a pilot.

1 Claim, 11 Drawing Figures

RICHARD S. HUGHES
JAMES L. PHILLIPS
INVENTORS

BY Roy Miller
ATTORNEY

METHOD OF MONOPULSE ANGLE GATING FOR COMPUTER

The invention described herein was made in the course of work done under Government Contract NOW 62-0289 with Texas Instruments, Incorporated and may be manufactured and used by or for the Government of the United States of America for governmental purposes without the payment of any royalties thereon or therefor.

BACKGROUND OF THE INVENTION

The invention relates to a monopulse system for measuring target angles or angle-off boresight of a detected target (situated in the antenna beam width) in a given plane containing the antenna boresight axis. In the present system, it was desired that the apparatus be completely passive; provide pursuit-navigation information to the servo system of the missile; provide direction-finding information of the radiating sources to the aircraft; be capable of operating over a wide rf bandwidth and a wide range of pulse-repetition frequencies and pulse widths; provide homing accuracies compatible with the kill radius of the missile and have no degradation of single target kill probability because of the presence of other radiating sources.

No systems are known at present which are capable of attaining the above desired goals, however, there are systems in existence which utilize monopulse gating for the detection of targets within the antenna beam. Examples of such systems are shown in U.S. Pat. Nos. 3,097,356 and 3,165,746. U.S. Pat. No. 3,097,356 relates to a system for reducing the effective width of a beam of radiation received by a radar antenna in order to increase the resolution of the display presented by the associated apparatus. This results in a technique known as monopulse resolution improvement and the system provides two transmitting and receiving horns displaced equal distances on opposite sides of the axis of focus or boresight or the antenna. The signals received by the two antenna horns are applied to two channels of a receiver and in one of these channels the two signals are added and in the other of the channels the two signals are subtracted from one another. The addition and subtraction signals thus produced are therafter subtracted from one another to produce a final signal which is indicative of targets lying substantially only within an angle of approximately (2°) along the boresight of the antenna.

The system set forth in U.S. Pat. No. 3,165,746 is specifically concerned with air traffic surveillance wherein maximum information rates and increased accuracy are critical to high speed traffic control of aircraft. The system provides a monopulse angle detection receiver having antenna elements, such as two or more apertures displaced vertically or horizontally from each other, for receiving signals from a target. There is also circuitry for increasing the effectiveness of the antenna comprising means responsive to the received signals for providing an automatic gain control signal which is a function of that one of the received signals having the larger amplitude.

SUMMARY OF THE INVENTION

The guidance system comprises two major subassemblies consisting of the radio-frequency receiver, incorporating an antenna, feed assembly and detectors and the guidance computer consisting of the basic computer and multiple target processing and scanning circuitry. The multiple-target processing and scanning section enables the guidance receiver to perform three basic functions when confronted with a single or multiple target situation. These functions comprise initial acquisition of a target, differentiating between signals from the acquired target and some extraneous source such that lock on a particular target can be maintained and reacquiring the same or new target depending on the circumstance in the event of losing a target.

DESCRIPTION OF THE PREFERRED EMBODIMENT

Figure 1:
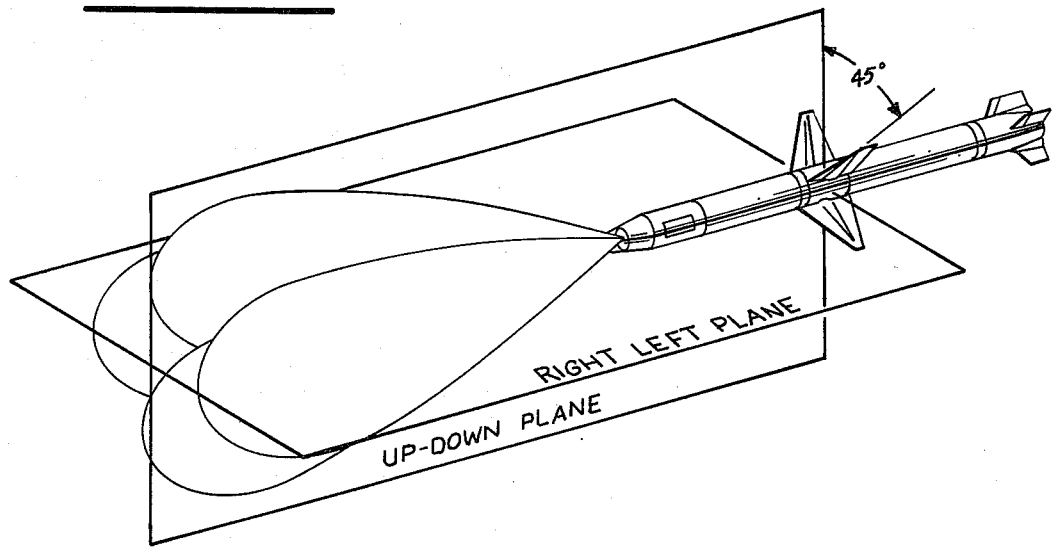
FIG. 1 illustrates the orientation of the monopulse beams with respect to the missile.

The radio-frequency receiver may be any one of the variety of wide band, four beam, monopulse types. The only requirement on the receiver is that it must be capable of generating four monopulse beams with the principle axes of opposite beam pairs located in two orthogonal planes. The intersection of the planes is along the boresight axis of the missile. They are also common to the up-down and right-left planes of the missile when it is aboard an aircraft at 45-degree angles to the hinge lines of the missile's control surfaces as shown in FIG. 1.

Figure 2:
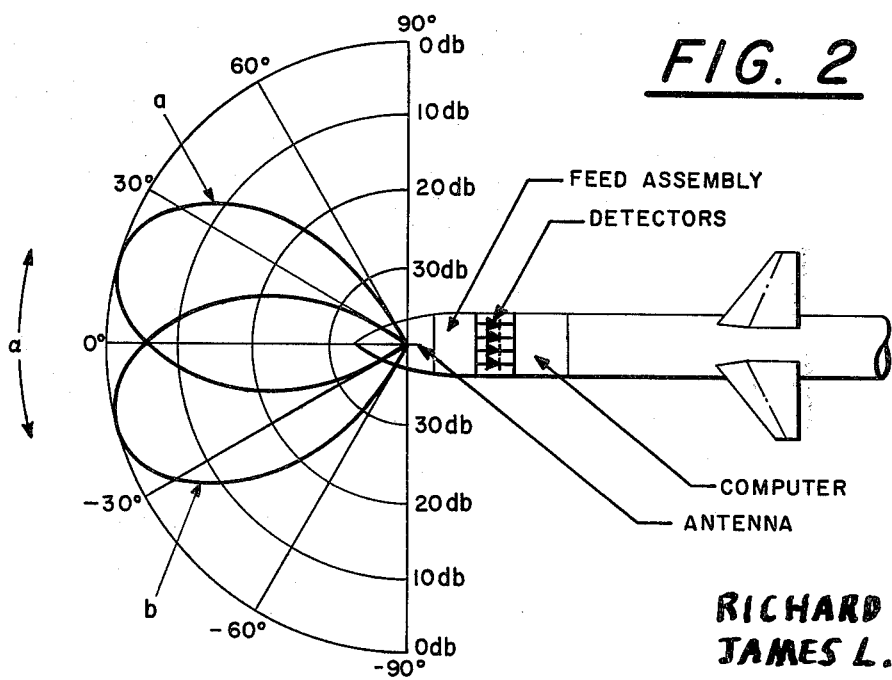
FIG. 2 illustrates the guidance system and the cross section of an opposite pair of monopulse beams.

Four output ports from the receiver section provide reception from each of the monopulse beams. This configuration is shown in FIG. 2 wherein the radial scale is in decibels. A specific requirement on the shape of the beams exists for angle measurement compatibility with the guidance computer in the system. It is required that the difference of the logarithms of opposite beams be directly proportional to the angle to a radiating source, $\alpha$, measured with respect to missile interline, that is to say, for the beams $a$ and $b$ of FIG. 2, $\log a - \log b = s\alpha$, (1) where $s$ is a constant of proportionality. Generally, the radio frequency receiver for the missile meets this requirement for angles within 20° of the missile's center line.

The four receiver output ports are connected to detectors that convert radio-frequency inputs into video-frequency outputs. In the square law region of a detector the voltage of the video-frequency output is proportional to the power of the radio-frequency input. As measured through the detectors, then, the four monopulse beams, $a$, $b$, $c$ and $d$ become A, B, C and D and are voltage levels corresponding to the shape of the monopulse beam. Equation (1) then becomes log A − log B = $s'\alpha$, (2) where $s'$ combines $s$ and the detector-conversion constant into a single factor. Similarly, for the other pair of monopulse beams and detectors, log C − log D = $s'\gamma$, (3) where $\gamma$ is the angle to a radiating source in that plane of measurement.

The solid-state video-frequency guidance computer receives four monopulse inputs in the form of video pulses with amplitudes that contain the necessary information for determining target location. These inputs are received from the detectors in the radio-frequency assembly shown in FIG. 2. The guidance computer processes the information that is contained in these inputs in order to provide the following outputs: (1) signals to be supplied to the control section of the missile to actuate the control surfaces; (2) signals to be supplied to a target-position indicator within the aircraft; and (3) a signal supplied to the pilot's earphones to provide audio analysis of the target, that is, pulse-repetition frequency of the target.

The actual computer is composed of three closed-loop type 1 servomechanisms. Two of the servo loops are used for tracking the target in the planes of the monopulse beams, i.e., the up-down and right-left planes of the missile when it is aboard the aircraft. The third servo loop is used for normalizing the target signal strength from the error function of the other servo loop.

Figure 3:
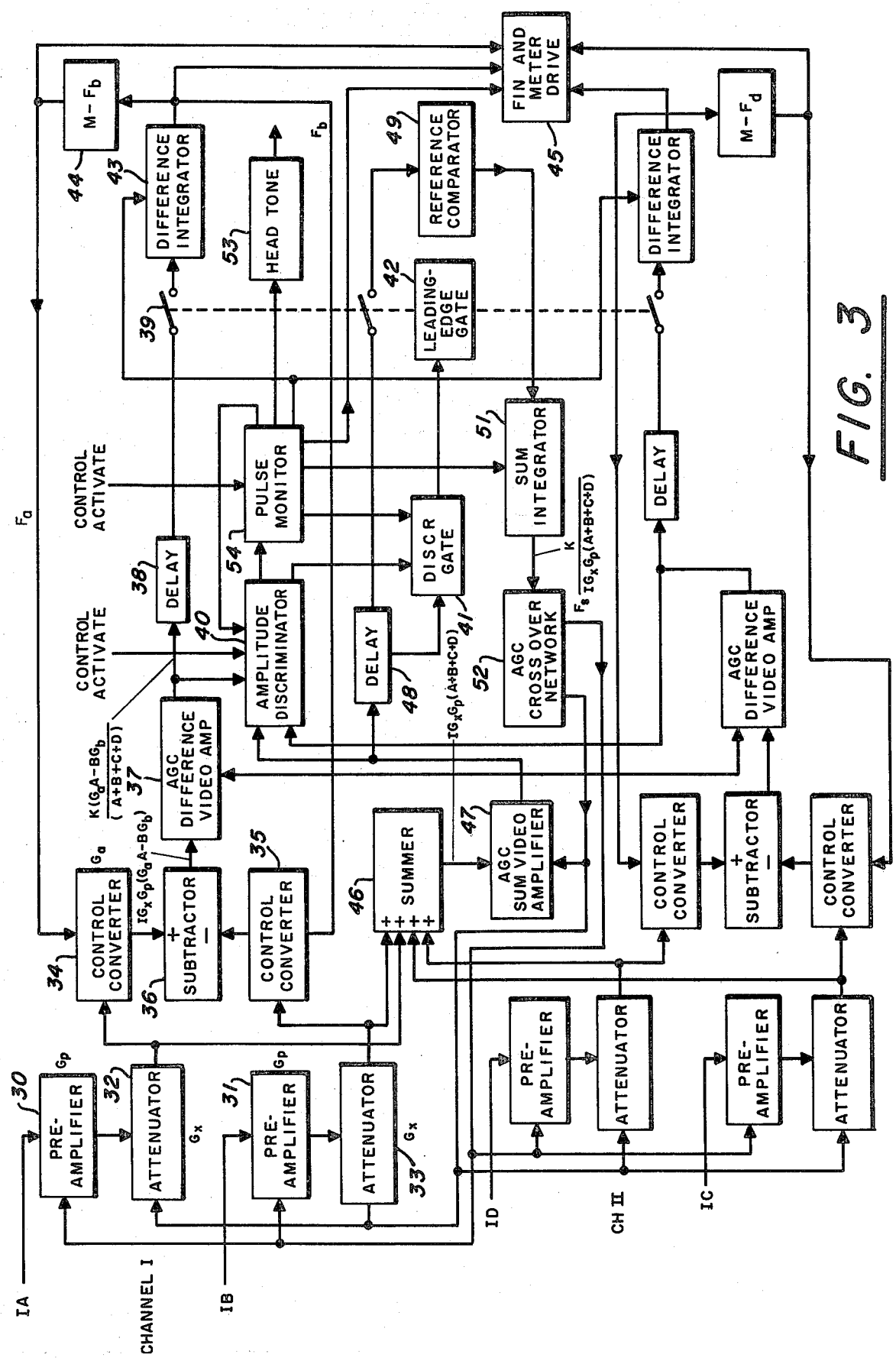
FIG. 3 is a block diagram of the angle gated computer.

With respect to the block diagram of FIG. 3, channels I and II are the two servo loops for solving the angular position of the target. Assume that a pulse of radio-frequency energy is received by the missile from the target. The target is located at an angle alpha ($\alpha$) in the up-down reference plane, and at an angle gamma ($\gamma$) in the left-right reference plane. The amplitude of the four video pulses at the input to the computer will be dependent upon the intensity I of the received energy and the amplitudes of the monopulse beams at angles alpha and gamma as seen at the video side of the detector of FIG. 2. The inputs to channel I then are IA and IB while IC and ID are the inputs to channel II. I is dependent upon the power output of the target, the radiation characteristics, relative attitude of the target antenna and the range to the target.

Referring to channel I only, in that the channel II components are exact duplicates, the inputs IA and IB are coupled into gain controlled preamplifiers 30 and 31, respectively, and thence to attenuators 32 and 33, respectively. The gain of the preamplifiers is $G_p$ and the gain of the attenuators is $G_r$. The output of the attenuators 32 and 33 is then coupled to the input of control converters 34 and 35, respectively, which are illustrated in greater detail in the schematic diagram of FIG. 10. The control converters of FIG. 10 will be referred to later in the discussion. The control converters are also gain-controlled with a logarithmic gain response.

The instantaneous gains of the control converters 34 and 35 are $G_a$ and $G_b$, respectively. The outputs of the control converters are subtracted in subtractor 36 and the difference coupled to an automatic-gain-controlled (AGC) difference video amplifier 37. For purposes of the basic target-position computation, the gain of the amplifier 37 is unimportant. The output of the video amplifier 37 is coupled through a delay line 38 to a movable switch contact 39 and also coupled as one input to an amplitude discriminator block 40 which is illustrated in greater detail in FIG. 6 and will be referred to subsequently. One output of the amplitude discriminator 40 is coupled as an input to a discriminator gate 41 the output of which is in turn coupled to a leading edge gate 42. The leading edge gate controls the movable switch contact 39 for the purpose of selecting just the leading edge of each pulse to be coupled into a difference integrator 43. The leading edge gate is necessary so that the missile will not guide on reflections from a target. Because reflections must take a longer path to arrive at the missile, energy from the reflections arives sometime after the energy that is received directly from the target antenna. Hence, only the leading edge of each pulse is used to supply guidance information.

Figure 4:
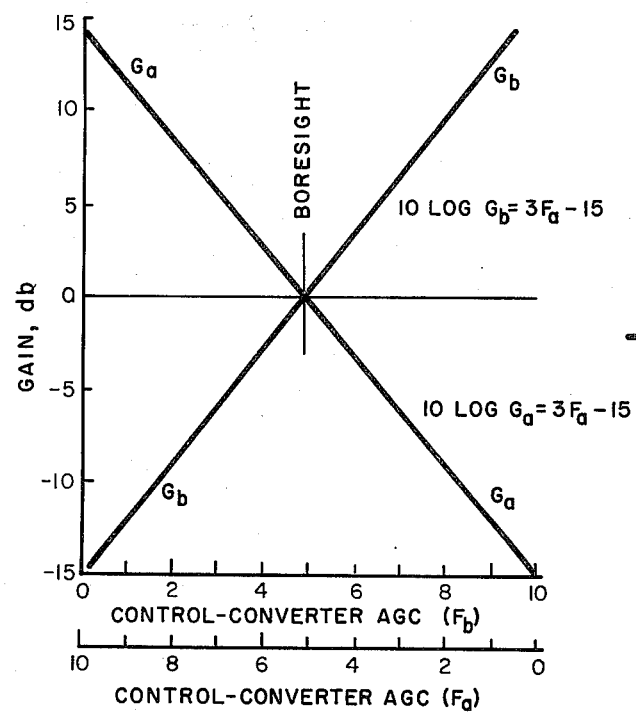
FIG. 4 illustrates control converter gain versus control converter AGC voltages.

The output of the difference integrator 43 corresponds to $F_b$ which is fed back to control $G_b$ on the control converter 35. $F_b$ is also subtracted from a voltage reference M in amplifier 44 to form the $F_a$ feedback signal for the control converter 34. Thusly, $F_a$ controls the gain $G_a$ of the other controlled converter. The gain of one control converter will be increased while the other is decreased to drive the difference of other outputs to zero. FIG. 4 shows the control converter gain characteristics for M = 10 volts.

For instance, suppose input IA is larger than input IB because of the particular orientation of the target with respect to the missile. It will then be necessary for the integrator to decrease $G_a$ of the control converter 34 while increasing $G_b$ of the control converter 35 in order to provide a zero difference from the control converters. The feedback signals $F_a$ and $F_b$ are then subtracted to provide the target-position information for the missile-control surfaces and the target-position indicator. This is done in a fin and meter drive apparatus 45 which is not illustrated in detail as it forms no part of the present invention. Channel II operates in exactly the same fashion as channel I and thus is not referred to in detail in the interest of simplicity.

Mathematically, the reason for the operations can be illustrated quite easily. The subtracted outputs comprising the input to the difference video amplifier 37, which will be referred to as E, are essentially zero when the system locks onto a target. That is, $$E = IG_rG_p(AG_a - BG_b) = 0 \tag{4}$$

Note that the target intensity, $I$, in the gain of the attenuators 32 and 33 and preamplifiers 30 and 31 can be dropped at this point whenever $E$ equals zero. Referring to FIG. 4, the equations for the control converter gain characteristics are:

$$G_a = 10^{(3/10)F_a - 3/2} \tag{5}$$

and $$G_b = 10^{(3/10)F_b - 3/2} \tag{6}$$

Substituting these into equation (4) and taking the logarithms of the terms, the result is:

$$\log A + (3/10)F_a - \log B - (3/10)F_b = 0,$$

or $$\log A - \log B = 3/10(F_b - F_a) \tag{7}$$

From Equation 2 by direct substitution, $$F_b - F_a = \frac{10s'}{3} \alpha \qquad (8)$$

Similarly, in channel II, $$F_c - F_d = \frac{10s'}{3} \gamma \qquad (9)$$

which provides the necessary target-location information in a convenient form for pilot-indicator operation. For control-surface operation, it is necessary to rotate the coordinate system axes 45°. Rotation is accomplished by combining the outputs as follows: Subtract the quantity ($F_a + F_c$) from ($F_b + F_d$) for one control-surface axis; and subtract the quantity ($F_a + F_d$) from ($F_b + F_c$) for the other control surface axis. This is analogous to subtracting beams ($b + d$) from ($A + C$) for one axis and subtracting beams ($b + c$) from ($a + d$) for the other axis (with respect to FIG. 1).

The discussion of the guidance computer thus far assumes a single radiating source in the vicinity of the missile, and that channel I and channel II servo loops are tracking that source. If more than one source is being received by the missile, however, there must be some method of accepting the signal from the target that is being tracked and rejecting all others.

It might be assumed that any pulses out the difference circuits that are not close to zero amplitude must be from other sources providing that the servo loops can track the targets to a high degree of accuracy. However, because the amplitudes of any pulses appearing out of the difference circuits are also a function of the target-intensity factor I it cannot be discerned, at this point, which pulses are from the target and which are not. Because of this, the intensity factor must be canceled out. This is the purpose of the third closed servo mechanism loop called the sum loop.

It must be understood at this point that the removal of target intensity by means of the sum loop is not a duplication of the removal of target intensity by channels I and II servo loops. The sum loop comes into play for cases where E is not equal to zero, contrary to the other two servo loops that solve the cases where E equals zero.

Referring back to FIG. 3, the four input signals to channels I and II are summed out of the four attenuators and used as an input to the sum loop. The output is first supplied to a summer 46 which provides an output as the input to an AGC sum video amplifier 47. The sum video amplifier 47 has identical AGC characteristics to the channels I and II difference video amplifiers of which video amplifier 37 is one. The output from the sum video amplifier 47 is coupled through a delay line 48 and subtracted from a reference voltage K in a reference comparator 49. In series with the delay line 48 and reference comparator 49 is a switch contact 50 which is actuated by the leading edge gate 42. The difference of the voltage reference K and the output of the sum video amplifier drives an integrator 51 in the sum loop. The output of the integrator, $F_s$, controls the gain of all the AGC video amplifiers, the preamplifiers and attenuators. This is accomplished by coupling the output of the sum integrator through an AGC crossover network 52 to the referenced circuit components.

The preamplifiers and attenuators are gain-controlled to reduce the dynamic range of input signals to the control converters and sum difference video amplifiers. The AGC crossover network 52 conditions the sum integrator 51 output to drive the variable gain attenuators, preamplifiers, and video amplifiers. The gain of the sum video amplifier 47 is controlled to drive its output signals toward the reference voltage K. Once this has been accomplished, K equals the input of the sum video amplifier times its gain. Because the input to the sum amplifier is $IG_xG_p(A + B + C + D)$, the gain must be $K/IG_xG_p(A + B + C + D)$, in order to have K as the output. In that $F_s$ is common to all three variable video amplifiers, the variable gain of the AGC difference video amplifiers is also $$K/IG_xG_p(A + B + C + D) \qquad (10)$$

Setting $A' = AG_a$ and $B' = BG_b$, the input to the channel I difference video amplifier 37 is $IG_xG_b(A' - B')$. The output of the video amplifier 37 is then $$K(A' - B')/(A + B + C + D) \qquad (11)$$

with the target intensity factor, and attenuator and preamplifier gains canceled. Similarly, the output of the channel II difference video amplifier is $$K(C' - D')/(A + B + C + D). \qquad (12)$$

Figure 5:
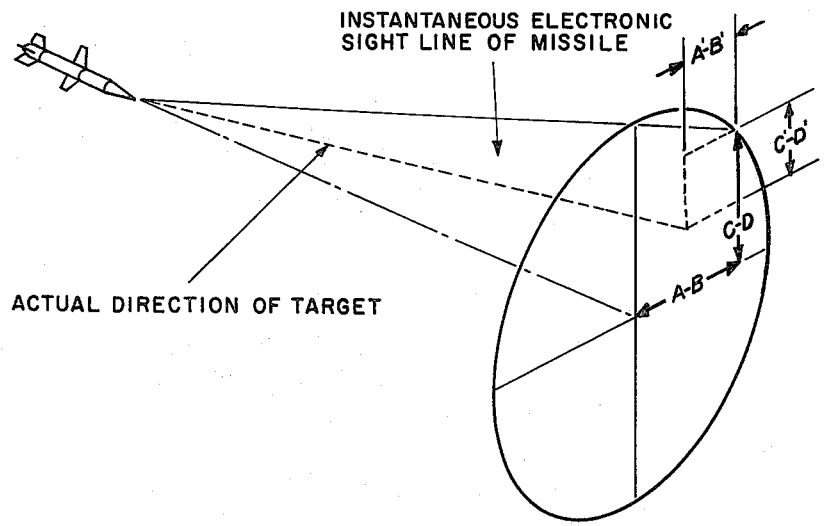
FIG. 5 illustrates missile error angle orientation.

Note that $A - B$ and $C - D$ represent angles measured with respect to the missile boresight axes, while $A' - B'$ and $C' - D'$ represent angles measured with respect to $A - B$ and $B - C$. This is illustrated in FIG. 5. In order to drive the difference integrators equally, that is the difference integrator 43 of channel I and the difference integrator corresponding thereto in channel II, independent of intensity, equations (11) and (12) must be constant for a given angular error.

The output of the AGC sum video amplifier 47 is also used for triggering the leading edge gate by coupling the output from the amplifier 47 as one input to the amplitude discriminator 40. This also provides a head tone signal to the pilot, by triggering head tone one-shot 53 which derives an output from a pulse monitor 54. The pulse monitor 54 derives an input from the amplitude discriminator 40 and a control activate input from the pilot. (Through the use of the head tone signal, the pilot can monitor the PRF of the target.)

The pulse monitor also has outputs which are coupled to the discriminator gate 41, sum integrator 51 and the difference integrators corresponding to difference integrator 43 in channel I and its counterpart in channel II.

The multiple-target processing and scanning section enables the guidance receiver to perform three basic functions when confronted with a single or multiple target situation. These functions comprise initial acquisition of a target, differentiating between signals from the acquired target and some extraneous source such that lock-on a particular target can be maintained and reacquiring the same or new target depending on the circumstance, in the event of losing a target.

The guidance computer, up to and including the AGC video amplifiers processes the signals from each and every source in the target environment. Therefore, a means must be provided to allow only the pulses from the target being tracked to enter the difference and sum integrators.

This is accomplished through angle and intensity discrimination. This is illustrated in FIG. 6 which is an expansion of the amplitude discriminator block 40 to FIG. 3.

The lower-intensity discrimination is accomplished by setting the leading edge gate threshold so that signals that are less than a given level below reference K will not operate the system. Upper-intensity discrimination necessary is accomplished by actuating an angle block one-shot 60 (FIG. 6) for signals greater than a given level above reference K.

Figure 6:
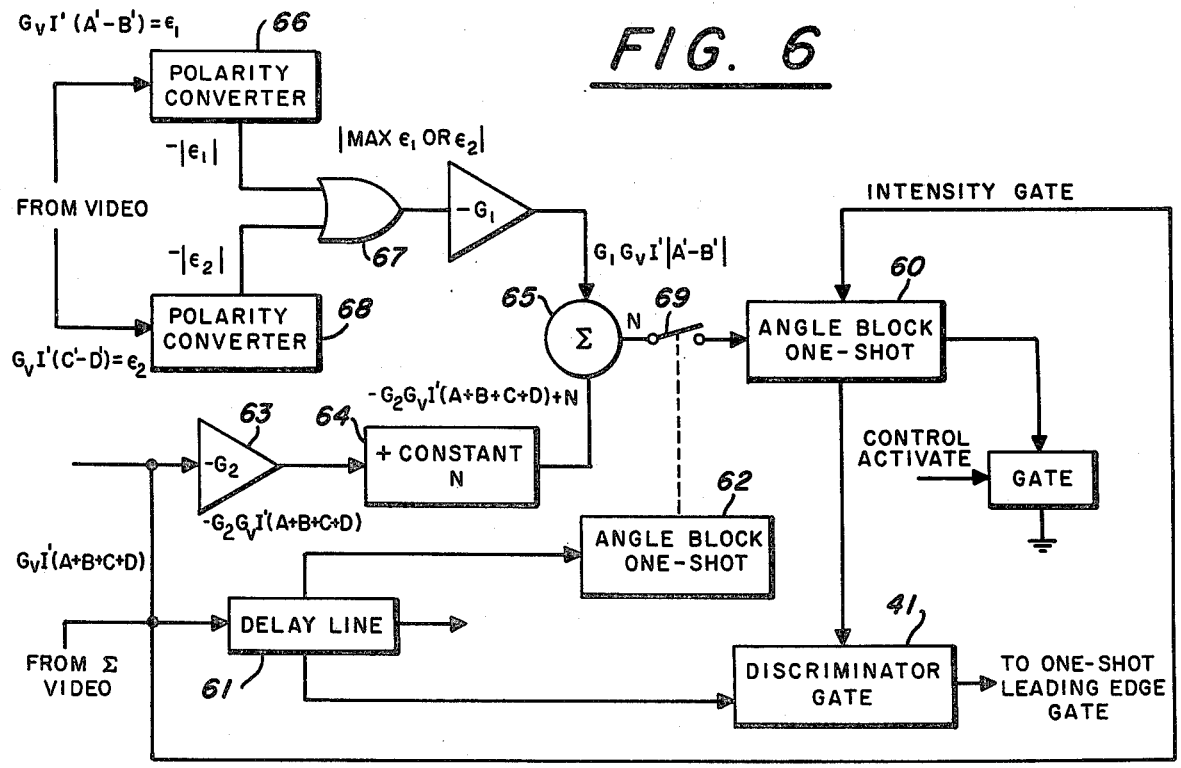
FIG. 6 is a more detailed breakdown of the amplitude discriminator within the angle gated computer.

In FIG. 6 the output from the sum video amplifier 47 is coupled in as one input to delay line 61 which has an output coupled to an angle gate enable 62 and another output coupled to a discriminator gate 41, the output of which is coupled to the leading edge gate 42 of FIG. 3. In addition, the output of the sum video amplifier 47 of FIG. 3 is coupled as one input to the angle block one-shot 50 and also coupled as an input to an amplifier 63 the output of which is coupled through an adder 64 to another summing circuit 65.

The output from the difference video amplifier 37 of channel I is coupled through a polarity converter 66 as one input to an OR gate 67. In addition, the output of the difference video amplifier of channel II is coupled through another polarity converter 68 as another input to the OR gate 67. The polarity converters will be explained in greater detail with respect to FIG. 10 subsequently. The output of the OR gate 67 is then coupled through an amplifier 68 as another input to the summing circuit 65. The output of the summing circuit 65 is coupled through a movable switch contact 69 as another input to the angle block one-shot 60.

Angle-gating is accomplished in the amplitude discriminator 40 of FIG. 3 which compares each difference pulse with the sum pulse. This comparison is made instantaneously, for the signals in the servo loops are passing through the delay lines associated therewith. If the signal is determined to be extraneous, the amplitude discriminator output operates the angle block one-shot 60, and the sum pulse is not allowed to fire the leading edge gate. The minimum extraneous signal that will block the amplitude discriminator is called the angle-gate threshold pulse. If the pulse is acceptable, there is no amplitude discriminator output and the signal is allowed to fire the leading edge gate. This process results in instantaneous, or monopulse angle gating (acceptance or rejection of a pulse depending on the angular position with respect to the missile from which it was received).

Figure 7:
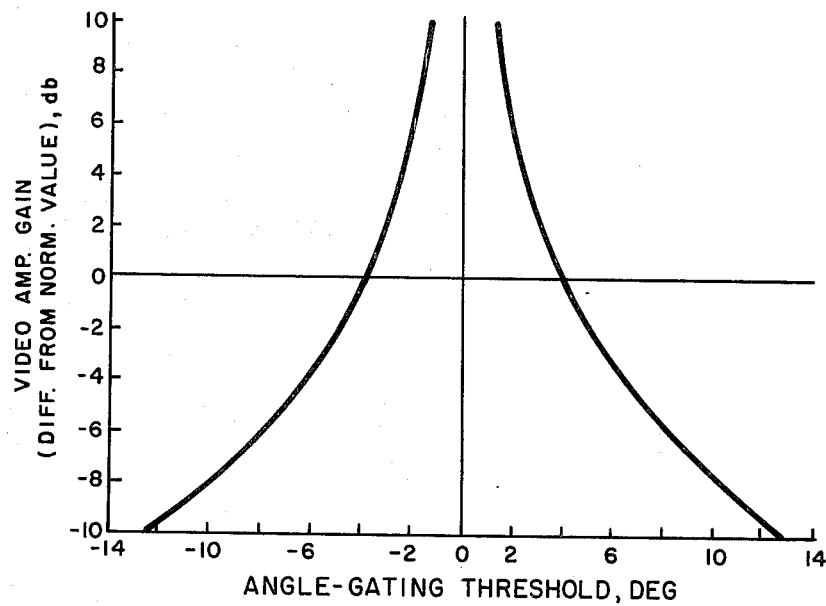
FIG. 7 illustrates video amplifier gain versus angle gating threshold.

The reason for comparing the difference-error pulse with the sum pulse will now be explained. When intensity modulation is experienced, the sum channel attempts to control the variable sum video amplifier gain so that if the next input pulse is of the same amplitude as the previous one, the output of the sum video amplifier would be K. Therefore, under intensity modulation, the sum video amplifier is always one pulse behind in its intensity modulation. The computer gain is then in error by the intensity difference between successive pulses. This results in a variable-scale factor for the difference video amplifiers and makes a fixed-angle-gating threshold useless. This is illustrated in FIG. 7 wherein the effect of differing instantaneous sum video amplifier gains from the normalized for a plus or minus 4-degree, fixed-angle-gate threshold is shown.

In that the difference video amplifiers of channels I and II are identical to the sum video amplifier, they are all above or below their normalized gains by the same amount; i.e., the instantaneous sum pulse has the same relationship to its normalized value as does an error signal in the difference loop to its normalized value. In the preceding discussion of a single target, it was assumed that the video amplifiers were at the proper normalizing gain so that the target intensity factor I could be canceled from the equations (11) and (12) representing the amplitude of the difference pulse out of the difference video amplifiers. For a more general case, however, these expressions must be written $$G_t I'(A' - B')$$ (13)

and $$G_t I'(C' - D')$$ (14)

where $G_t$ is the instantaneous gain of the sum and difference video amplifiers and $I'$ is the intensity factor for that particular input pulse. However, note that if $I'$ is equal to I in equation (10), then equations (13) and (14) then become equations (11) and (12), respectively.

Referring back to FIG. 6, the difference pulses from both channels I and II are processed through polarity converters 66 and their outputs coupled through the OR gate 67. The output of the OR gate 67 is therefore the absolute value of the larger amplitude difference pulse, which is then amplified by a gain factor, $G_1$. If the assumption is made that $A' - B'$ is greater than $C' - D'$, the expression for the difference pulse at the summing point 65 is $$G_1 G_t I' |A' - B'|.$$ (15)

The corresponding sum pulse from the sum video amplifier is amplified by a gain factor $G_2$ in the amplifier 63 and added to a constant N in the amplifier 64. The output at the summing point 65 then becomes $$G_1 G_t I' |A' - B'| - G_2 G_t I'(A + B + C + D) + N.$$ (16)

The angle block one-shot 60 is set to trigger whenever equation (16) is greater than or equal to $N$. The threshold condition for blocking a pulse is then $$G_1 G_t I' |A' - B'| - G_2 G_t I'(A + B + C + D) = 0,$$

or $$|A' - B'| = G_2/G_1(A + B + C + D).$$ (17)

Equation (17) sets forth the angle-gate limits for the case where $|A' - B'|$ is greater than $|C' - D'|$. If the opposite is true, equation (17) becomes $$|C' - D'| = G_2/G_1(A + B + C + D).$$ (18)

Note that the size of the angle-gate is completely independent of the intensity of the pulse and the gain of the video amplifiers in the servo loops. It is, however, dependent upon the exact shapes of the four monopulse antenna lobes because of the expression $(A + B + C + D)$. Ideally the quantity $(A + B + C + D)$ would be constant and independent of the angle off boresight. Practically however, this is true only for angles near boresight. Note also that the angle-gate size can be set by adjusting the values of $G_1$ or $G_2$.

The angle-gate enable 62, controlling the input to the angle block one-shot 60, improves system performance with low-intensity input signals. Four signals are combined to provide the sum pulse, therefore it has a better signal-to-noise ratio than the difference pulses. The sum pulse from the delay line 61 is therefore used to prevent noise from actuating the angle-gate between signals. The result is an improvement in system sensitivity. The angle-gate 62 enablement time is the same as the leading edge gate width.

Figure 8:
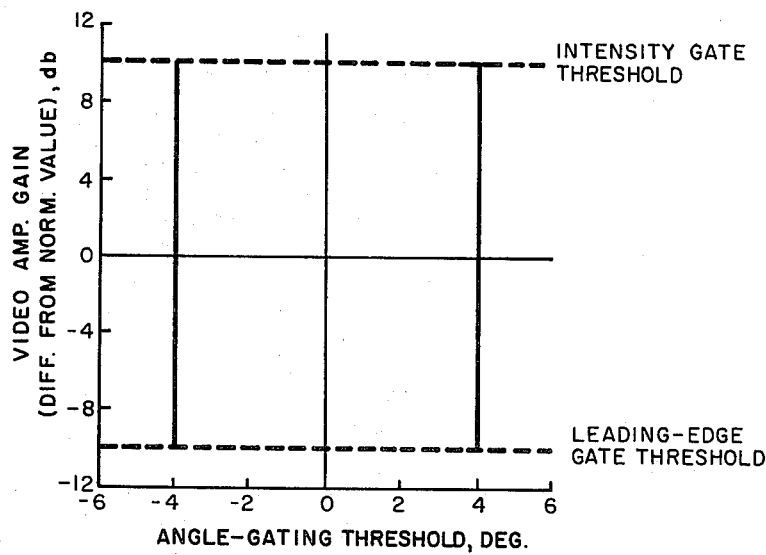
FIG. 8 illustrates video amplifier gain versus angle gating threshold for monopulse gating.

The resultant-angle-gate characteristic versus difference from normalized video amplifier gain is illustrated in FIG. 8. $G_1$ and $G_2$ have been set for plus or minus 4-degree angle-gate in this case. The lower-intensity limit is the leading edge gate threshold and the upper-intensity limit is set by the intensity-gate threshold. The result is that the system will only see instantaneous intensity changes within these limits, and will instantaneously gate out any pulses beyond the angle-gate threshold.

Figure 9:
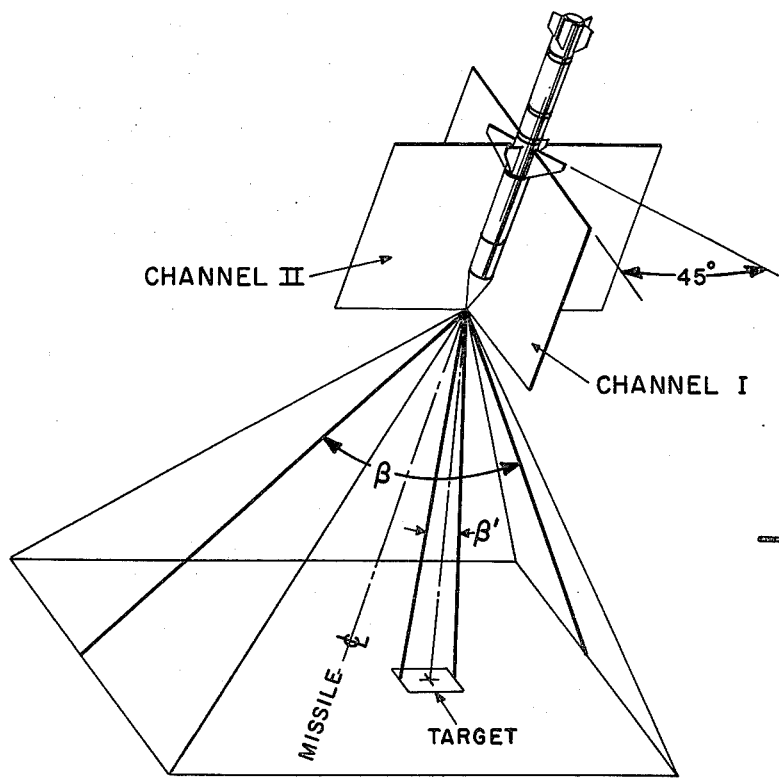
FIG. 9 sets forth in pictorial fashion angle gate limits.

The narrow look angle, as described above, is desirable when the guidance receiver is locked-on to a target. Initial acquisition however, would be difficult if not impossible. In the amplitude discriminator 40 of FIG. 3, the gain of amplifier $G_1$ is determined by the output of the pulse monitor 54. If the gain is low, a proportionally larger amplitude pulse corresponding to a larger angular error will be required to operate angle-gates. This corresponds to the wide look angle, $\beta$ in FIG. 9. The look angle of the guidance receiver can be varied from its minimum of $\beta'$ to $\beta$ as controlled by the pulse monitor 54.

Figure 10:
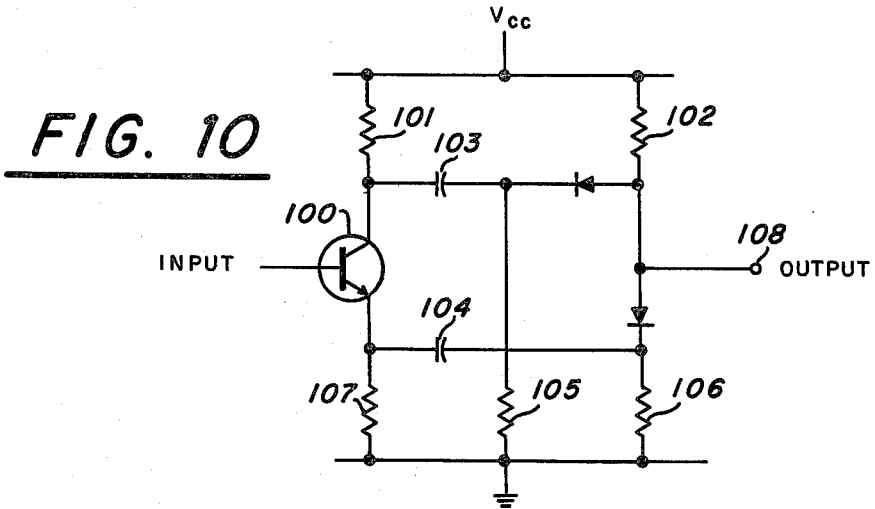
FIG. 10 is a circuit diagram of the polarity converter within the amplitude discriminator of FIG. 6.

The polarity converter utilized in FIG. 6 block diagram is set forth in greater detail in FIG. 10 wherein an input corresponding to the output of a difference video amplifier is coupled into the base of a transistor 100. Collector bias is coupled in through a resistor 101 to the collector of the transistor 100 and the same collector bias voltage coupled through another resistor 102 to the cathodes of diodes $D_1$ and $D_2$. The anodes of diodes $D_1$ and $D_2$ are coupled through capacitors 103 and 104 to the collector and emitter, respectively, of the transistor 100. In addition, the common connection of capacitor 103 and diode $D_1$ is connected to ground through a resistor 105 while the common connection of capacitor 104 and diode $D_2$ is also connected to ground through a resistor 106. The emitter of the transistor 100 is also connected to ground through a resistor 107. The common point of the cathodes are connected in common on diodes $D_1$ and $D_2$ and form an output which is coupled to an output terminal at 108.

In operation, if a positive pulse is coupled into the base of transistor 100 the output at the collector is negative while the output at the emitter is positive. Diode $D_1$ conducts, thereby passing the negative polarity while at the same time diode $D_2$ blocks the positive pulse thereby producing an output which corresponds to a negative pulse. If a negative pulse is coupled into the base of the transistor 100 the collector goes positive and the emitter becomes more negative and diode $D_2$ conducts while diode $D_1$ blocks the positive pulse and again the output is a negative pulse. If the polarities of diodes $D_1$ and $D_2$ are reversed, the output will be a positive one independent of input polarity.

Figure 11:
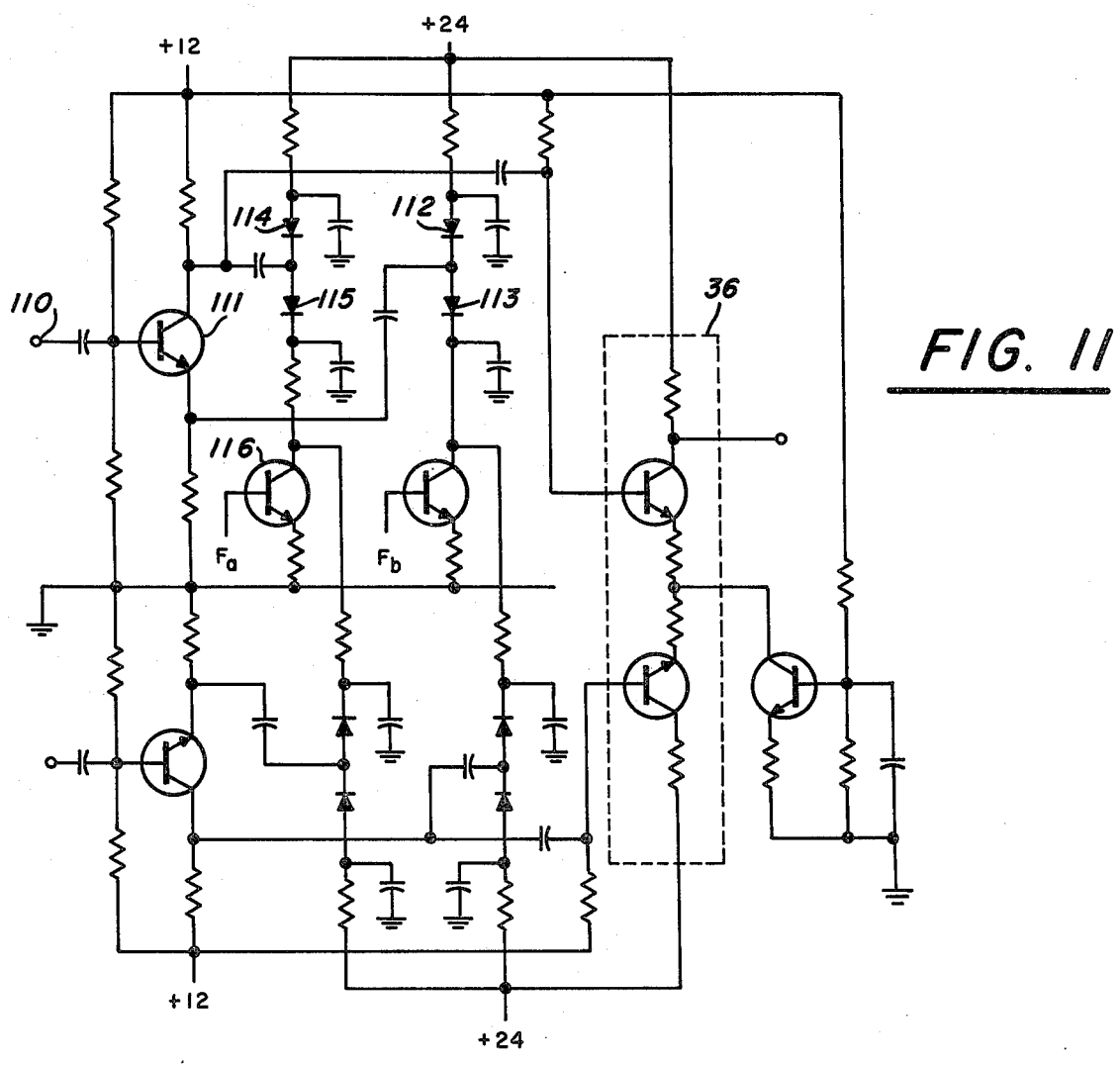
FIG. 11 is a detailed schematic of the control converter shown in FIG. 3.

In the circuit diagram of FIG. 11 which illustrates the control converter 34 and the difference amplifier 36 of FIG. 3 the explanation will be made with respect to one channel only. An input corresponding to the output of the attenuator 32 is coupled in at input 110 to the base of a common emitter amplifier 111. Silicon diodes 112, 113, 114 and 115, driven from a constant current source are used to AGC the emitter and collector resistances of the transistor 111. For the channel $I_a$ input, $F_a$ is coupled into the collector of another transistor 116 through the silicon diodes 114 and 115 and thence to the collector of transistor 111. $F_b$ is coupled into the collector of transistor through diodes 112 and 113. (it will be recalled that as $F_a$ increases, $F_b$ decreases, FIG. 4). The gain of the entire circuit in FIG. 11 is a logarithmic function of control voltage ($F_a$) and ($F_b$) and is stable with temperature.

In the overall operation of the system the guidance apparatus has two scan modes of operation. The mode used while on board the aircraft inhibits the operation of the angle-gates and the upper-intensity gate. The mode used during controlled flight operates as described previously. The two modes require different scanning techniques. The pulse monitor 54 of FIG. 3, senses the state of certain switches within the control section to determine the proper mode of operation, and also monitors the output of the sum loop to determine if the scan should be initiated.

At missile turn on, the sum AGC is driven to the maximum gain level at the same time that the system is boresighted. With no angle-gates or upper-intensity gates, any signal within the dynamic range of the system will be accepted. Within a few pulses of input signal, the system will normalize the angle and intensity characteristics of the target. If two or more targets have signal strengths within the dynamic range of the system, the system will tend to normalize about the one with the higher intensity. Signals 10 db below this level will be rejected by the lower-intensity gate. If all targets are nominally the same intensity, the system will normalize about a virtual target whose position is a function of the characteristics of the target. Upon loss of signal, the pulse monitor will return the system to maximum gain and boresight.

At control activation, a signal is applied to the pulse monitor to cause the system to change modes of operation and force a scan to acquire the highest intensity target nearest the boresight axis of the missile.

Obviously many modifications and variations of the present invention are possible in the light of the above teachings. It is, therefore, to be understood that within the scope of the appended claims the invention may be practiced otherwise than as specifically described.

What is claimed is:

1. A monopulse angle-gated computer for determining the direction of an energy radiating source comprising:
    receiver means for generating beam pairs having principle axes located in intersecting orthogonal planes;
    a servo-mechanism associated with each of said beam pairs and receiving the output of said receiver means corresponding to a beam pair and producing an error function dependent upon the voltage difference of each individual beam pair,
    said servo-mechanism being adapted to determine the angle to said energy radiating source,
    a further servo-mechanism coupled to each of said first-mentioned servo-mechanisms for normalizing the source signal strength from the error function of said first-mentioned servo-mechanisms, summing means included in said further servo-mechanism adapted to receive an input corresponding to each of said individual beams and having an output, gating means operative to interrupt the flow of information through the first-mentioned servo-mechanisms, said gating means having a predetermined reference threshold level so that signals at a given level below a reference will not allow operation of the first-mentioned servo-mechanisms, upper intensity discrimination means adapted to be actuated when the input signal is greater than a given level above the reference, the upper intensity discrimination corresponds to angle-gating, said further servo-mechanisms incorporating amplitude discrimination means, the input to said amplitude discriminating means comprising the difference pulses from the first-mentioned servo-mechanisms and a summation pulse from said last mentioned servo-mechanisms, and said amplitude discriminator operating to compare each difference pulse with the summation pulse.

* * * * *

UNITED STATES PATENT AND TRADEMARK OFFICE
CERTIFICATE OF CORRECTION

PATENT NO. : 3,921,175
DATED : 18 November 1975
INVENTOR(S) : Richard S. Hughes and James L. Phillips It is certified that error appears in the above—identified patent and that said Letters Patent are hereby corrected as shown below:

On the cover,

[75]  Inventors: Richard S. Hughes; James L. Phillips, both of Dallas, Texas is corrected to read:

[75]  Inventors: Richard S. Hughes of China Lake, CA; James L. Phillips of Dallas, Texas Signed and Sealed this twenty-seventh Day of April 1976

[SEAL]

Attest:

RUTH C. MASON
Attesting Officer

C. MARSHALL DANN
Commissioner of Patents and Trademarks